United States Patent
Powell et al.

(10) Patent No.: US 6,495,060 B2
(45) Date of Patent: *Dec. 17, 2002

(54) REFRIGERANT COMPOSITIONS

(75) Inventors: Richard L. Powell, Cheshire (GB); Stuart Corr, Cheshire (GB); Frederick T. Murphy, Cheshire (GB); James D. Morrison, Cheshire (GB)

(73) Assignee: Ineos Fluor Holdings Limited, Southampton (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,809

(22) PCT Filed: Aug. 18, 1997

(86) PCT No.: PCT/GB97/02199

§ 371 (c)(1), (2), (4) Date: Feb. 10, 2000

(87) PCT Pub. No.: WO98/08913

PCT Pub. Date: Mar. 5, 1998

(65) Prior Publication Data

US 2002/0063234 A1 May 30, 2002

(30) Foreign Application Priority Data

Aug. 30, 1996 (GB) .............................. 9618181

(51) Int. Cl.$^7$ ................................ C09K 5/00
(52) U.S. Cl. ........................ 252/67; 62/114
(58) Field of Search ................ 252/67, 68; 62/114

(56) References Cited

U.S. PATENT DOCUMENTS 5,558,810 A * 9/1996 Minor et al.
5,800,729 A * 9/1998 Wilson et al.

FOREIGN PATENT DOCUMENTS

| GB | 2 274 462 | 7/1994 |
| GB | 2291884 | * 7/1996 |
| WO | 94 22973 | 10/1994 |
| WO | 96 10061 | 4/1996 |
| WO | 96 15206 | 5/1996 |
| WO | 97 05211 | 2/1997 |
| WO | 97 10312 | 3/1997 |

OTHER PUBLICATIONS

Database WPI, Section Ch, Week 9327, Derwent Publications Ltd., AN93–217100 XP002045885 & JP 05 140 546 A, Jun. 8, 1993.

* cited by examiner

Primary Examiner—Margaret Einsmann
(74) Attorney, Agent, or Firm—Cook, Alex, McFarron, Manzo, Cummings & Mehler, Ltd.

(57) ABSTRACT

A composition comprising
(A) 1,1,2,2,3-pentafluoropropane($CF_2HCF_2CFH_2$) and
(B) at least one hydrofluorocarbon selected from the group consisting of 1,1,1,3,3-pentafluoropropane ($CF_3CH_2CF_2H$) and 1,1,1,2,2,3,3,4,4-nonafluorobutane ($CF_3CF_2CF_2CF_2H$) is described. The composition is useful as a refrigerant and may be used in chillers as a replacement for refrigerant R-11.

15 Claims, No Drawings

REFRIGERANT COMPOSITIONS

This invention relates to compositions which are suitable for refrigeration applications and to the use of such compositions in heat transfer devices such as refrigeration and air conditioning systems. The invention relates, in particular, to refrigerant compositions which can be used in the applications currently satisfied by trichlorofluoromethane (refrigerant R-11).

Heat transfer devices of the mechanical compression type such as refrigerators, freezers, heat pumps and air conditioning systems are well known. In such devices a refrigerant liquid of a suitable boiling point evaporates at low pressure taking heat from a neighbouring heat transfer fluid. The resulting vapour is then compressed and passes to a condenser where it condenses and gives off heat to another heat transfer fluid. The condensate is then returned through an expansion valve to the evaporator so completing the cycle. The mechanical energy required for compressing the vapour and pumping the liquid may be provided by an electric motor or an internal combustion engine.

In addition to having a suitable boiling point and a high latent heat of vaporisation, the properties preferred of a refrigerant include low toxicity, non-flammability, non-corrosivity, high stability and freedom from objectionable odour.

Hitherto, heat transfer devices have tended to use fully and partially halogenated chlorofluorocarbon refrigerants such as bromotrifluoromethane (refrigerant R-13B1), trichlorofluoromethane (refrigerant R-11), dichlorodifluoromethane (refrigerant R-12), chlorodifluoromethane (refrigerant R-22) and the azeotropic mixture of chlorodifluoromethane and chloropentafluoroethane (refrigerant R-115); the azeotrope being refrigerant R-502. Refrigerant R-11, for example, has been widely used in chillers.

However, the fully halogenated chlorofluorocarbons in particular have been implicated in the destruction of the earth's protective ozone layer and as a result the use and production thereof has been limited by international agreement.

Whilst heat transfer devices of the type to which the present invention relates are essentially closed systems, loss of refrigerant to the atmosphere can occur due to leakage during operation of the equipment or during maintenance procedures. It is important, therefore, to replace fully halogenated chlorofluorocarbon refrigerants by materials having low or zero ozone depletion potentials.

In addition to the possibility of ozone depletion, it has been suggested that significant concentrations of chlorofluorocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals.

Replacements for some of the chlorofluorocarbon refrigerants presently in use have already been developed. These replacement refrigerants tend to comprise selected hydrofluoroalkanes, i.e. compounds which contain only carbon, hydrogen and fluorine atoms in their structure. Thus, refrigerant R-12 is generally being replaced by 1,1,1,2-tetrafluoroethane (R-134a).

Although suitable replacement refrigerants are available, there is always a need for new refrigerants having a low or zero ozone depletion potential that are capable of replacing the chlorofluorocarbon refrigerants presently in use such as R-11. Furthermore, very real benefits could be realised by a new replacement refrigerant having a higher refrigeration capacity than the chlorofluorocarbon refrigerant it is replacing.

The present invention provides a composition comprising a mixture of compounds having zero ozone depletion potentials which can be used, for example, in chillers as a replacement for refrigerant R-11. The composition of the invention can exhibit an advantageously high refrigeration capacity.

According to the present invention there is provided a composition comprising:
(A) 1,1,2,2,3-pentafluoropropane ($CF_2HCF_2CFH_2$); and
(B) at least one hydrofluorocarbon selected from the group consisting of 1,1,1,3,3-pentafluoropropane ($CF_3CH_2CF_2H$) and 1,1,1,2,2,3,3,4,4-nonafluorobutane ($CF_3CF_2CF_2CF_2H$).

The present invention also provides a heat transfer device, such as a chiller, comprising an evaporator, a condenser, a compressor and an expansion valve in which there is contained a refrigerant composition comprising:
(A) 1,1,2,2,3-pentafluoropropane ($CF_2HCF_2CFH_2$); and
(B) at least one hydrofluorocarbon selected from the group consisting of 1,1,1,3,3-pentafluoropropane ($CF_3CH_2CF_2H$) and 1,1,1,2,2,3,3,4,4-nonafluorobutane ($CF_3CF_2CF_2CF_2H$).

The composition of the invention comprises (A) 1,1,2,2,3-pentafluoropropane (R-245ca) which has a boiling point of about 25° C. and (B) at least one hydrofluorocarbon selected from 1,1,1,3,3-pentafluoropropane (R-245fa) and 1,1,1,2,2,3,3,4,4-nonafluorobutane (R-329ccb), both of which have a boiling point of about 15° C. Although component (B) may comprise a mixture of R-245fa and R-329ccb, it will preferably comprise just one of these compounds and more preferably will comprise just R-329ccb.

The composition of the invention tends to boil and condense over a fairly narrow temperature range and, as a result, tends to exhibit fairly small temperature glides in both the evaporator and condenser. Furthermore, the composition tends not to fractionate (separate) into its constituent components to any significant degree on boiling so that the liquid and vapour phases that will be present in the refrigeration cycle will tend to have similar compositions. The terms azeotrope and azeotropic are well known of course and refer to compositions comprising two or more components which exhibit constant boiling behaviour and which do not fractionate into their constituent components upon boiling or evaporation. Thus, the composition of the invention exhibits properties which are not too far removed from that of a true azeotrope and in this regard may be termed azeotrope-like or near-azeotropic.

The amounts of the R-245ca and of the at least one hydrofluorocarbon selected from R-245fa and R-329ccb in the composition of the invention may be varied within wide limits, but typically the composition will comprise from 10 to 90% by weight of R-245ca and from 10 to 90% by weight of at least one hydrofluorocarbon selected from R-245fa and R-329ccb.

When component (B) is R-245fa, a preferred composition of the invention in terms of its suitability as a replacement for refrigerant R-11 is one comprising from 15 to 85% by weight of R-245ca and from 15 to 85% by weight of R-245fa.

When component (B) is R-245fa, a particularly preferred composition of the invention in terms of its suitability as a replacement for refrigerant R-11 is one comprising from 20 to 30% by weight, more particularly about 25% by weight, of R-245ca and from 70 to 80% by weight, more particularly about 75% by weight, of R-245fa.

When component (B) is R-245fa, another particularly preferred composition of the invention in terms of its suitability as a replacement for refrigerant R-11 is one comprising from 45 to 55% by weight, more particularly about 50% by weight, of R-245ca and from 45 to 55% by weight, more particularly about 50% by weight, of R-245fa.

When component (B) is R-245fa, a further particularly preferred composition of the invention in terms of its suitability as a replacement for refrigerant R-11 is one comprising from 70 to 80% by weight, more particularly about 75% by weight, of R-245ca and from 20 to 30% by weight, more particularly about 25% by weight, of R-245fa.

When component (B) is R-329ccb, a preferred composition of the invention in terms of its suitability as a replacement for refrigerant R-11 is one comprising from 40 to 95% by weight of R-245ca and from 5 to 60% by weight of R-329ccb.

When component (B) is R-329ccb, a particularly preferred composition of the invention in terms of its suitability as a replacement for refrigerant R-11 is one comprising from 40 to 80% by weight, more particularly from 70 to 80% by weight, of R-245ca and from 20 to 60% by weight, more particularly from 20 to 30% by weight, of R-329ccb. An especially preferred composition of the invention in terms of its suitability as a replacement for refrigerant R-11 is one comprising about 75% by weight of R-245ca and about 25% by weight of R-329ccb.

The refrigerant composition of the invention may also be combined with one or more hydrocarbons in an amount which is sufficient to allow the composition to transport a mineral oil or alkyl benzene type lubricant around a refrigeration circuit and return it to the compressor. In this way, inexpensive lubricants based on mineral oils or alkyl benzenes may be used to lubricate the compressor.

Suitable hydrocarbons for inclusion in the refrigerant composition of the invention are those containing from 2 to 6 carbon atoms, with hydrocarbons containing from 3 to 5 carbon atoms being preferred. Hydrocarbons that will not significantly alter the refrigerant thermophysical properties at the level at which they provide for oil transport, such as the linear and branched isomers of butane and pentane are particularly preferred, with pentane being especially preferred.

Where a hydrocarbon is included, it will preferably be present in an amount of from 1 to 10% by weight on the total weight of the refrigerant composition.

The refrigerant composition of the invention may also be used in combination with the types of lubricants which have been specially developed for use with hydrofluorocarbon based refrigerants. Such lubricants include those comprising a polyoxyalkylene glycol base oil. Suitable polyoxyalkylene glycols include hydroxyl group initiated polyoxyalkylene glycols, e.g. ethylene and/or propylene oxide oligomers/polymers initiated on mono- or polyhydric alcohols such as methanol, butanol, pentaerythritol and glycerol. Such polyoxyalkylene glycols may also be end-capped with suitable terminal groups such as alkyl, e.g. methyl groups. Another class of lubricants which have been developed for use with hydrofluorocarbon based refrigerants and which may be used in combination with the present refrigerant compositions are those comprising a neopentyl polyol ester base oil derived from the reaction of at least one neopentyl polyol and at least one aliphatic carboxylic acid or an esterifiable derivative thereof. Suitable neopentyl polyols for the formation of the ester base oil include pentaerythritol, polypentaerythritols such as di- and tripentaerythritol, trimethylol alkanes such as trimethylol ethane and trimethylol propane, and neopentyl glycol. The esters may be formed with linear and/or branched aliphatic carboxylic acids, such as linear and/or branched alkanoic acids. Preferred acids are selected from the $C_{5-8}$, particularly the $C_{5-7}$, linear alkanoic acids and the $C_{5-10}$, particularly the $C_{5-9}$, branched alkanoic acids. A minor proportion of an aliphatic polycarboxylic acid, e.g. an aliphatic dicarboxylic acid, may also be used in the synthesis of the ester in order to increase the viscosity thereof. Usually, the amount of the carboxylic acid(s) which is used in the synthesis will be sufficient to esterify all of the hydroxyl groups contained in the polyol, although residual hydroxyl functionality may be acceptable.

The composition of the present invention may be used to provide the desired cooling in heat transfer devices such as chillers by a method which involves condensing the composition and thereafter evaporating it in a heat exchange relationship with a heat transfer fluid to be cooled. In particular, the composition of the invention may be employed as a replacement for refrigerant R-11 in chillers.

In addition to its use as a refrigerant, the composition of the invention may also be used as an aerosol propellant, as a foam blowing agent for blowing polyolefin, polyurethane and related foams, or as a solvent in degreasing or extraction applications.

The present invention is now illustrated but not limited with reference to the following examples.

EXAMPLE 1

The performance of three refrigerant compositions of the invention in a refrigeration cycle was evaluated using standard refrigeration cycle analysis techniques in order to assess the suitability thereof as a replacement for R-11. The operating conditions which were used for the analysis were chosen as being typical of those conditions which are found in a chiller or air conditioning system, and counter current flow at the heat exchangers was assumed.

The evaluation involved first defining the inlet and outlet temperatures of the heat transfer fluid, which could be air or water for example, at each heat exchanger (evaporator and condenser). The temperatures in the evaporator and condenser, assuming that a pure (single component) refrigerant was used in the cycle, were then chosen and these temperatures together with the inlet and outlet temperatures of the heat transfer fluid referred to above were used to determine a target log mean temperature difference for each heat exchanger. In the cycle analysis itself, the refrigerant inlet and outlet temperatures at both the evaporator and condenser were adjusted until the target log mean temperature difference was achieved for each heat exchanger. When the target log mean temperature difference for each heat exchanger was achieved, the various properties of the refrigerant composition in the cycle were recorded.

The following refrigerant compositions were subjected to the cycle analysis:
(1) A composition comprising 75% by weight R-245ca and 25% by weight R-245fa.
(2) A composition comprising 50% by weight R-245ca and 50% by weight R-245fa.
(3) A composition comprising 25% by weight R-245ca and 75% by weight R-245fa.

The following operating conditions were used in the cycle analysis.

| EVAPORATOR: | |
|---|---|
| Evaporator Temperature: | 5° C. |
| Inlet Temperature of Heat Transfer Fluid | 20° C. |
| Outlet Temperature of Heat Transfer Fluid | 12° C. |
| Log Mean Temperature Difference for Evaporator | 10.5° C. |
| CONDENSER: | |
| Condenser Temperature: | 32° C. |
| Inlet Temperature of Heat Transfer Fluid | 20° C. |
| Outlet Temperature of Heat Transfer Fluid | 30° C. |
| Log Mean Temperature Difference for Condenser | 5.58° C. |
| Amount of Superheat: | 5° C. |
| Amount of Subcooling: | 5° C. |
| Isentropic Compressor Efficiency: | 75% |
| Volumetric Flow through Compressor | 1 m³/s |

The results of analysing the performance of the three refrigerant compositions in a refrigeration cycle using these operating conditions are given in Table 1.

The performance parameters of the refrigerant compositions which are presented in Table 1 and in Table 2, i.e. condenser pressure, evaporator pressure, discharge temperature, refrigeration capacity (by which is meant the cooling duty achieved per unit swept volume of the compressor), coefficient of performance (COP) (by which is meant the ratio of cooling duty achieved to mechanical energy supplied to the compressor), and the glides in the evaporator and condenser (the temperature range over which the refrigerant composition boils in the evaporator and condenses in the condenser), are all art recognised parameters.

The performance of refrigerant R-11 under the same operating conditions is also shown in Table 1 by way of comparison.

It is apparent from Table 1 that refrigerant compositions of the invention containing R-245ca and R-245fa have small temperature glides in both the evaporator and condenser, i.e. they display azeotrope-like or near azeotropic behaviour. It is also apparent from Table 1 that the R-245ca/R-245fa compositions tested had a higher refrigeration capacity than R-11 while maintaining a very similar coefficient of performance. In addition to this, the discharge temperatures of the R-245ca/R-245fa compositions tested were appreciably less than that of refrigerant R-11, and although the evaporator and condenser pressures of the compositions were generally higher than for R-11, they were comparable.

It is further evident from the results given in Table 1 that the performance of refrigerant compositions of the invention containing R-245ca and R-245fa is such that they could make an acceptable replacement for refrigerant R-11.

EXAMPLE 2

The performance of three refrigerant compositions of the invention in a refrigeration cycle was evaluated using exactly the same technique and exactly the same operating conditions as described in Example 1.

The following refrigerant compositions were subjected to the cycle analysis:
(1) A composition comprising 75% by weight R-245ca and 25% by weight R-329ccb.
(2) A composition comprising 50% by weight R-245ca and 50% by weight R-329ccb.
(3) A composition comprising 25% by weight R-245ca and 75% by weight R-329ccb.

The results of analysing the performance of these three refrigerant compositions in a refrigeration cycle are given in Table 2.

The performance of refrigerant R-11 under the same operating conditions is also shown in Table 2 by way of comparison.

It is apparent from Table 2 that refrigerant compositions of the invention containing R-245ca and R-329ccb have small temperature glides in both the evaporator and condenser, i.e. they display azeotrope-like or near azeotropic behaviour. It is also apparent from Table 2 that the R-245ca/R-329ccb compositions tested had a higher refrigeration capacity than R-11 while maintaining a similar coefficient of performance. In addition to this, the discharge temperatures of the R-245ca/R-329ccb compositions tested were appreciably less than that of refrigerant R-11, and although the evaporator and condenser pressures of the compositions were generally higher than for R-11, they were comparable.

It is further evident from the results given in Table 2 that the performance of refrigerant compositions of the invention containing R-245ca and R-329ccb is such that they could make an acceptable replacement for refrigerant R-11.

TABLE 1

| Refrigerant % by weight | R-11 100 | R-245ca/ R-245fa 75/25 | R-245ca/ R-245fa 50/50 | R-245ca/ R-245fa 25/75 |
|---|---|---|---|---|
| Evaporator Pressure (bar) | 0.5 | 0.49 | 0.54 | 0.59 |
| Condenser Pressure (bar) | 1.34 | 1.46 | 1.59 | 1.73 |
| Discharge Temperature (° C.) | 52.79 | 41.83 | 41.46 | 40.99 |
| Coefficient of Performance (COP) | 7.21 | 7.21 | 7.2 | 7.15 |
| COP Relative to R-11 | 1 | 1 | 1 | 0.99 |
| Refrigeration Capacity (KW/m³) | 495.05 | 529.1 | 574.71 | 621.12 |
| Refrigeration Capacity Relative to R-11 | 1 | 1.07 | 1.16 | 1.25 |
| Evaporator Glide (° C.) | 0 | 0.54 | 0.74 | 0.57 |
| Condenser Glide (° C.) | 0 | 0.57 | 0.77 | 0.59 |

TABLE 2

| Refrigerant % by weight | R-11 100 | R-245ca/ R-329ccb 75/25 | R-245ca/ R-329ccb 50/50 | R-245ca/ R-329ccb 25/75 |
|---|---|---|---|---|
| Evaporator Pressure (bar) | 0.5 | 0.47 | 0.52 | 0.58 |
| Condenser Pressure (bar) | 1.34 | 1.42 | 1.51 | 1.65 |
| Discharge Temperature (° C.) | 52.79 | 39.37 | 36.49 | 33.39 |
| Coefficient of Performance (COP) | 7.21 | 7.15 | 7.1 | 6.96 |
| COP Relative to R-11 | 1 | 0.99 | 0.98 | 0.97 |
| Refrigeration Capacity (KW/m³) | 495.05 | 507.61 | 537.63 | 571.43 |
| Refrigeration Capacity Relative to R-11 | 1 | 1.03 | 1.09 | 1.15 |
| Evaporator Glide (° C.) | 0 | 0.46 | 0.78 | 0.78 |
| Condenser Glide (° C.) | 0 | 0.38 | 0.65 | 0.65 |

What is claimed is:

1. A composition comprising:

(A) 1,1,2,2,3-pentafluoropropane (R-245ca); and
(B) 1,1,1,3,3-pentafluoropropane (R-245fa).

2. A composition as claimed in claim 1 comprising:
(A) from 10 to 90% by weight of R-245ca; and
(B) from 10 to 90% by weight of R-245fa.

3. In a method of cooling which comprises condensing refrigerant R-11, the improvement which comprises replacing the R-11 with the composition of claim 1.

4. A composition as claimed in claim 1 comprising from 15 to 85% by weight of R-245ca and from 15 to 85% by weight of R-245fa.

5. A composition as claimed in claim 4 comprising from 20 to 30% by weight of R-245ca and from 70 to 80% by weight of R-245fa.

6. A composition as claimed in claim 5 comprising about 25% by weight of R-245ca and about 75% by weight of R-245fa.

7. A composition as claimed in claim 4 comprising from 45 to 55% by weight of R-245ca and from 45 to 55% by weight of R-245fa.

8. A composition as claimed in claim 7 comprising about 50% by weight of R-245ca and about 50% by weight, of R-245fa.

9. A composition as claimed in claim 4 comprising from 70 to 80% by weight of R-245ca and from 20 to 30% by weight of R-245fa.

10. A composition as claimed in claim 1 which additionally comprises at least one hydrocarbon.

11. A composition as claimed in claim 10, wherein the least one hydrocarbon comprises pentane.

12. A composition as claimed in claim 10 or claim 11 wherein the hydrocarbon is present in an amount of from 1 to 10% by weight on the total weight of the composition.

13. A heat transfer device containing a composition as claimed in claim 1.

14. A method for providing cooling which comprises condensing a composition as claimed in claim 1 and thereafter evaporating it in a heat exchange relationship with a heat transfer fluid to be cooled.

15. A composition as claimed in claim 9 comprising about 75% by weight of R-245ca and about 25% by weight of R-245fa.

* * * * *